United States Patent [19]

Miyake et al.

[11] Patent Number: 4,717,961

[45] Date of Patent: Jan. 5, 1988

[54] ELECTRONIC STILL CAMERA PREVENTING PREMATURE REMOVAL OF RECORDING DISK

[75] Inventors: Izumi Miyake; Kiyotaka Kaneko; Kazuya Oda, all of Tokyo, Japan

[73] Assignee: Fuji Photo Film Co., Ltd., Kanagawa, Japan

[21] Appl. No.: 893,063

[22] Filed: Aug. 1, 1986

[30] Foreign Application Priority Data

Aug. 2, 1985 [JP] Japan .................. 60-169681
Aug. 2, 1985 [JP] Japan .................. 60-169682

[51] Int. Cl.⁴ .................. H04N 5/225; H04N 5/76
[52] U.S. Cl. .................. 358/229; 358/906; 358/335
[58] Field of Search ............ 358/229, 909, 335, 906; 354/295, 83, 174, 288 A, 173.1, 173.11

[56] References Cited

U.S. PATENT DOCUMENTS

| | | | |
|---|---|---|---|
| 3,760,701 | 9/1973 | Paglia et al. | 354/83 |
| 4,000,500 | 12/1976 | Ivester et al. | 354/83 |
| 4,363,547 | 12/1982 | Hashimoto et al. | 354/173.1 |
| 4,466,019 | 8/1984 | Sakashita | 358/229 |
| 4,470,077 | 9/1984 | Komine | 358/229 |
| 4,547,815 | 10/1985 | Kimura | 358/335 |

*Primary Examiner*—Gene Z. Rubinson
*Assistant Examiner*—Stephen Brinich
*Attorney, Agent, or Firm*—Sughrue, Mion, Zinn, Macpeak & Seas

[57] ABSTRACT

An electronic camera in which images are electrically recorded on a magnetic disk that can be removed from a receptacle that can be opened. The receptacle is prevented from opening when a picture is being taken and recorded, thus prevention incomplete recording. Such prevention can be accomplished by coupling the receptacle release to a lens cover or to a power switch powering the recording.

8 Claims, 4 Drawing Figures

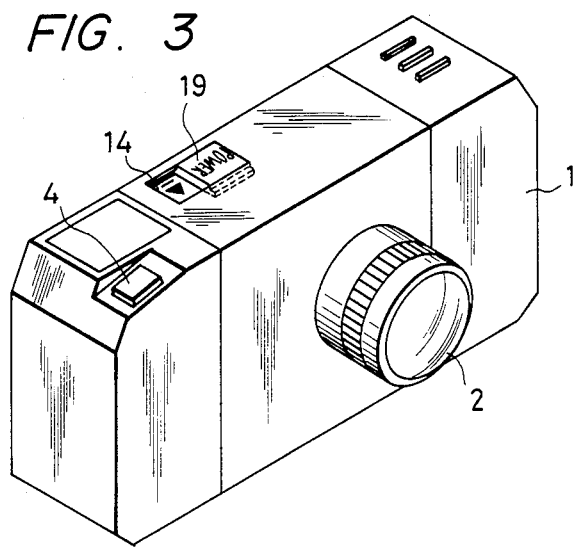
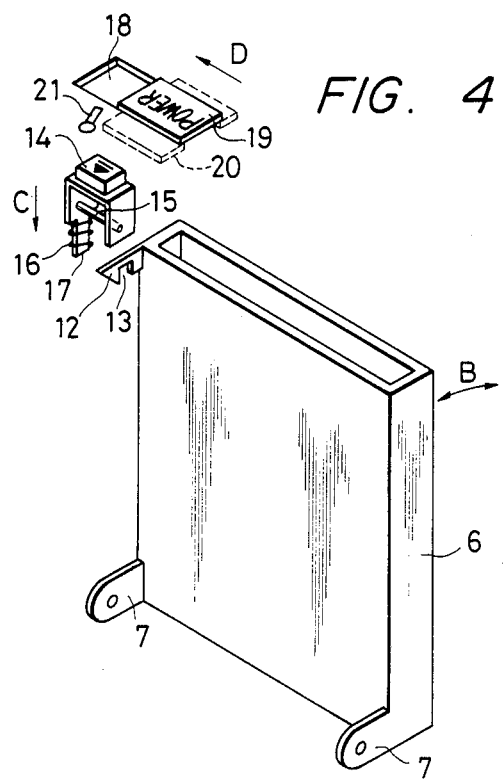

ELECTRONIC STILL CAMERA PREVENTING PREMATURE REMOVAL OF RECORDING DISK

BACKGROUND OF THE INVENTION

1. Field of the Invention

This invention relates to a still picture recording device such as an electronic still camera. More particularly, the invention relates to an electronic still camera with a mechanism for preventing the ejection of a recording medium during a photographic operation.

2. Background Art

Recently, an electronic still camera system has been developed in which an image pickup device such as a solid-state image pickup element or an image pickup tube and a recording device using a recording medium such as a magnetic material or memory are used in combination to allow purely electronic photographing of an object. That is, the camera records the picture as an electrical signal on the recording medium. The still picture thus recorded is reproduced by a separately provided television system or printer.

In the electronic still camera, a recording medium is loaded into a receptacle which is coupled to the camera body in such a manner that it can be freely opened and closed, and the still picture of the object is electrically recorded on the recording medium. The recording medium of the electronic still camera, unlike a conventional silver halide film, can be freely exposed to light. Therefore, the recording medium can be freely loaded into or unloaded from the camera before it has been completely recorded.

When the electronic still camera is not used for a photographing and recording operation, the recording medium can be freely into or removed from the camera, as was described above. However, if, during a photographing and recording operation, the ejection switch is accidentally touched or operated to open the receptacle, then the object may not be photographed or its image is incompletely recorded on the recording medium.

SUMMARY OF THE INVENTION

Accordingly, an object of this invention is to provide an electronic still camera with a simple mechanism for preventing the possibility that the recording medium is accidentally ejected during a photographing and recording operation.

According to one embodiment of the invention, an electronic still camera has a lens cover which is integrally mounted on the camera body so that it can take at least two positions, a lens opening position and a lens closing position. An image pickup device such as a solid-state image pickup element or image pickup tube and a recording device using a recording medium, such as a magnetic material or memory, are used in combination to record the image of an object, as an electrical signal, on the recording medium. Additionally, there is provided means for preventing the difficulty that the recording medium is removed from the camera body when the lens cover takes the lens opening position. For this purpose, the ejection switch is so positioned on the camera body that it is covered by the lens cover. That is, it cannot be operated when the lens cover is moved to the lens opening position.

In an alternative embodiment, the premature removal of the recording medium relies upon means for preventing the recording medium from being removed from the camera body when a power switch for activating the camera is set at the operating position thereof. For this purpose, the ejection switch is so positioned that it cannot be operated during the photographing and recording operation because it is covered by the power switch.

With the electronic still camera of the invention, the photographic operation is started after the lens cover has been set at the lens opening position, and the removal of the recording medium is prevented by the lens cover until the lens cover is closed after the photographic operation. In the alternative embodiment, the removal of the recording medium is prevented by the power switch for the period of time which elapses from the time instant that the power switch is set at the operating position until the power switch is turned off after the photographing operation. Either approach prevents the difficulty that the recording medium is ejected while the electrical signals are being recorded. This recording is carried out on the recording medium at substantially the same time as the photographic operation, so that, if the recording medium is prematurely ejected, the object is not photographed or its still picture is incompletely recorded.

BRIEF DESCRIPTION OF THE DRAWINGS

FIG. 3 is a perspective view of a second embodiment of an electronic still camera.

FIG. 4 is a perspective view showing a mechanism for locking the recording disk receptacle for the camera of FIG. 3

DETAILED DESCRIPTION OF THE PREFERRED EMBODIMENTS

Two embodiments of this invention will be described with reference to the accompanying drawings in detail.

Figure 1:
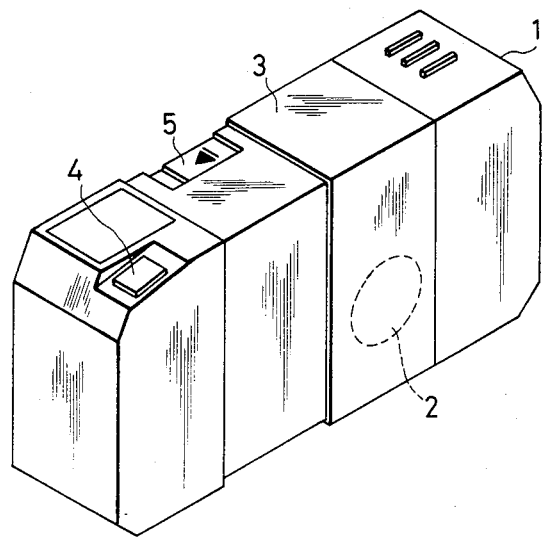
FIG. 1 is a perspective view of a first embodiment of an electronic still camera with a mechanism for preventing the ejection of a recording medium during photographing.
Figure 2:
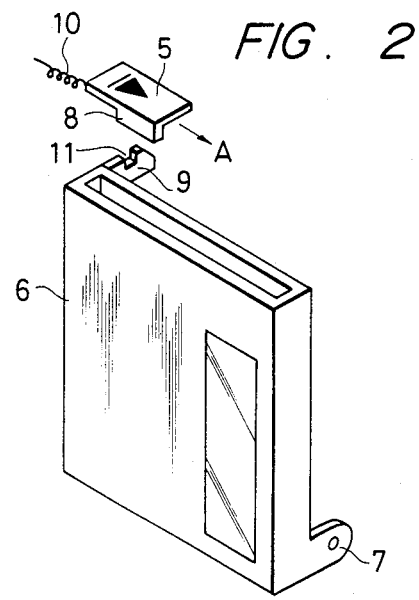
FIG. 2 is a perspective view of a locking mechanism for a recording disk receptacle for the camera of FIG. 1.

FIG. 1 shows an electronic still camera of a first embodiment of the present invention with a mechanism for preventing the ejection of a recording medium during the photographing and recording. In the electronic still camera of the invention, a U-shaped lens cover 3 selectively covers a photographic lens 2 and mounted on a camera body 1 in such a manner that it is slidable in the horizontal direction of the camera body 1. This sliding movement allows the lens cover 3 to take two positions, a photographing lens opening position and a photographing lens closing position. A receptacle 6, shown in FIG. 2 is used for loading a recording medium, namely, a magnetic disc, and is provided on the rear side of the camera body 1, opposite the lens. The locking mechanism of the receptacle 6 is as shown in FIG. 2. More specifically, the receptacle 6 is pivotally supported by hinges 7 which are provided at both sides of the lower portion of the receptacle 6. A locking lever 9 having a cut 11 is formed on the upper end of the receptacle 6. The cut 11 of the locking lever 9 is engaged with a protrusion 8 extended from the ejection switch 5, so that the protrusion 8 extends downward from an ejection switch 5. Thus the receptacle 6 is locked to the camera body. The ejection switch 5 is set at the locking position by a spring 10 whose one end is secured to the camera body 1. As the ejection switch 5 is slid in the direction of the arrow A, the protrusion 8 is disengaged from the locking lever 9, so that the receptacle 6 is released. As the receptacle 6 is closed, the protrusion 8 of the ejection switch 5 is abutted against the end of the locking lever 9. As the receptacle 6 is further pushed, the locking lever 9 is bent downwardly by the sloped surface formed at the end portion of the locking lever 9 and finally the protrusion 8 is fitted in the cut 11 of the locking lever 9.

The ejection switch 5 with the above-described locking mechanism is slidably disposed in a recess formed in the lens cover sliding surface which is a part of the top surface of the camera body. The sliding cover 3 can slide over the ejection switch 5. Furthermore, the ejection switch 5 is so positioned that it is exposed when the photographing lens 2 is covered by the lens cover 3, and it is covered when the photographing lens 2 is exposed.

The photographing procedure of the electronic still camera will now be described. The operator operates the ejection switch 5 to open the receptacle 6 and then loads the magnetic disc. Before an object is photographed, the lens cover 3 is slid to uncover the photographing lens 2. The object is then photographed by pushing a release button 4 of the camera. Substantially at the same time, the image of the object is recorded, as electrical signals, on the magnetic disc in the receptacle 6. Then, the lens cover 3 is slid to cover the photographing lens 2. Thus, the photographing operation has been accomplished. As is apparent from the above description, the electronic still camera of the invention is so designed that, during photographing and recording, the ejection switch 5 cannot be operated by the operator because it is covered by the lens cover 3.

In the above-described embodiment, the ejection preventing device is so designed that the ejection switch 5 is made inoperable by sliding to the lens cover 3 to the opening position. However, it may be so modified that the opening of the receptacle itself is prevented by sliding the lens cover 3 to the opening position. Furthermore, the embodiment has been described with reference to the magnetic disc. However, the technical concept of the invention is equally applicable to the case where the recording medium is a semiconductor memory or the like. In addition, the invention is not limited to the above-described receptacle locking mechanism.

According to the invention, the removal of the recording medium is prevented for the period of time that elapses from the instant that the lens cover is opened until it is closed. This effect prevents the difficulty that, during photographing and recording, the recording medium is removed and the image of the object is incompletely recorded. The mechanism for achieving this object in the first embodiment is simple in construction and low in manufacturing cost.

A second embodiment of an electronic still camera also has a mechanism for preventing a recording medium from being ejected during a photographing and recording operation. In this embodiment as shown in FIG. 3, the camera body 1 includes an image pickup device and a recording device using a recording medium, namely, a magnetic disk. The photographing lens 2 may be longer than that shown in FIG. 1. The receptacle 6, shown in FIG. 4, is used for loading a magnetic disc and is located at the rear side of the camera body 1.

The receptacle 6 has a locking mechanism in the second embodiment as shown in FIG. 2. Hinges 7 are formed at both ends of the lower end portion of the receptacle 6 so that the receptacle 6 can swing as indicated by the arrow B. A locking lever 12 is formed on the upper end of the bucket 6 and has a cut 13, while an ejection button 14 has a locking member 15. The cut 13 of the locking lever 12 is engaged with the locking member 15, to lock the receptacle 6 and prevent its opening. The ejection button 14 is movable vertically. However, it is biased upwardly by a spring 16 which is wound on a protrusion 17 of the ejection button 14. When the ejection button 14 is pushed downwardly, or in the direction of the arrow C, the locking member 15 is disengaged from the cut 13 of the locking lever 10, as a result of which the receptacle 6 is released. As the receptacle 6 is closed, the locking member 15 is abutted against the end portion of the locking lever 12. As the receptacle 6 is further pushed, the ejection button 14 is pushed downwardly by the sloped surface which is formed at the end portion of the locking lever 12. Finally the engaging member 15 is fitted in the cut 13 of the locking lever 12.

The ejection button with the above-described locking mechanism is provided in the upper portion of the camera body 1, and is operated through a rectangular opening 18 which is formed in the upper surface of the camera body 1. A power switch 19 is slidably engaged with the opening 18. When the power switch 19 is slid to cover the opening 18, a lower arm 20 of the switch 19 moves a toggle 21 that switches power from a battery to the electronics of the camera. When the power switch 3 is slid to its operating position (in the direction of the arrow D in FIG. 2), power is turned on and the opening 18 is closed so that the ejection button 14 is covered by the power switch 19.

The photographing procedure of the electronic still camera thus constructed will now be described. The photographer depresses the ejection button 14 to open the receptacle 6 and he then loads the magnetic disc. Before an object is photographed, the power switch 19 is slid to activate the camera. Under this condition, the release button 4 is depressed to photograph the object. Substantially at the same time, the image of the object is recorded, as an electrical signal, on the magnetic disc. Then, the power switch 19 is slid back to interrupt the power source. Thus, the photographing operation has been accomplished. As is apparent from the above description, during the photographing and recording operation, the photographer cannot operate the ejection button 14 because the ejection button 14 is covered by the power switch 19.

According to the second embodiment of the invention, the removal of the recording medium is prevented by the power switch for the period of time which elapses from the time instant that the power switch is turned on until the power switch is turned off. This effect prevents the difficulty that the recording medium is accidentally ejected during the photographing and recording operation with the result that the object is not photographed or its picture is incompletely recorded. The mechanism for achieving this in the second embodiment is also simple in construction and low in manufacturing cost.

What is claimed is:

1. An electronic camera, comprising:
   a camera body;
   a lens mounted on said camera body;
   a receptacle for selective holding of a recording medium;

means for disengaging said receptacle from said camera body to allow removal of said recording medium;

means for electrically recording an image external of said camera received through said lens onto said recording medium; and means for inhibiting said disengaging means during operation of said recording means.

2. An electronic camera as recited in claim 1, further comprising:

a lens cover integrally mounted on said camera body, selectively disposable in a first position covering said lens and a second position exposing said lens; and wherein said inhibiting means inhibits said disengaging means when said lens cover is in said second position.

3. An electronic camera as recited in claim 2, wherein said lens cover is slidable along said camera body between said first and second positions.

4. An electronic camera as recited in claim 3;

wherein said disengaging means includes a manually actuatable switch; and wherein said lens cover covers said manually actuatable switch in said second position and exposes said manually actuatable switch in said first position.

5. An electronic camera as recited in claim 1, further comprising:

a movable switch for enabling said recording means in an enabled position of said movable switch; and wherein said inhibiting means is coupled to said movable switch and inhibits said disengaging means when said movable switch is in said enabled position.

6. An electronic camera as recited in claim 5, wherein said movable switch selectively supplies electrical power to said recording means.

7. An electronic camera as recited in claim 5;

wherein said disengaging means includes a manually actuatable switch; and wherein said movable switch when in said enabled position covers said manually actuatable switch.

8. An electronic camera as recited in claim 7, wherein said movable switch is manually slidable along said camera body.

* * * * *